(12) United States Patent
Zhang et al.

(10) Patent No.: US 12,010,653 B2
(45) Date of Patent: Jun. 11, 2024

(54) COMMUNICATION METHOD AND COMMUNICATIONS APPARATUS FOR RESOURCE SELECTION

(71) Applicant: HUAWEI TECHNOLOGIES CO., LTD., Shenzhen (CN)

(72) Inventors: Xingwei Zhang, Lund (SE); Fan Yang, Beijing (CN); Haining Huang, Beijing (CN); Zhe Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 418 days.

(21) Appl. No.: 17/246,144

(22) Filed: Apr. 30, 2021

(65) Prior Publication Data
US 2021/0258921 A1 Aug. 19, 2021

Related U.S. Application Data

(63) Continuation of application No. PCT/CN2019/115150, filed on Nov. 1, 2019.

(30) Foreign Application Priority Data

Nov. 2, 2018 (CN) .......................... 201811300738.4

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/40* (2023.01); *H04W 72/53* (2023.01); *H04W 74/0808* (2013.01)

(58) Field of Classification Search
CPC ..... H04W 72/02; H04W 72/40; H04W 72/53; H04W 72/0446; H04W 74/0808
See application file for complete search history.

(56) References Cited

U.S. PATENT DOCUMENTS 10,291,364 B2 * 5/2019 Wakabayashi .......... H04L 5/001
11,006,451 B2 * 5/2021 Yasukawa ......... H04W 74/0816
(Continued)

FOREIGN PATENT DOCUMENTS

CN 105553612 A 5/2016
CN 108631968 A 10/2018
(Continued)

OTHER PUBLICATIONS

NTT DOCOMO, Inc., "Evaluation and discussion on resource selection for pedestrian UEs," 3GPP TSG RAN WG1 Meeting #86, Gothenburg, Sweden, R1-167362, total 7 pages, 3rd Generation Partnership Project, Valbonne, France (Aug. 22-26, 2016).
(Continued)

*Primary Examiner* — Chandrahas B Patel
(74) *Attorney, Agent, or Firm* — Leydig, Voit & Mayer, Ltd.

(57) ABSTRACT

This application provides a communication method and a communications apparatus. The communication method includes: a first terminal device determines a first parameter, where the first parameter is used to indicate a parameter of a sensing window, a parameter of a resource selection window, and/or a parameter of a first time window, and the first time window includes the sensing window and the resource selection window. The first terminal device determines a first resource pool from at least one resource pool based on the first parameter. The first terminal device selects a first resource from the first resource pool. The first terminal device transmits sidelink information on the first resource. According to the method provided in embodiments of this application, a data transmission delay can be reduced and system communication efficiency can be improved.

20 Claims, 3 Drawing Sheets

(51) Int. Cl.
  *H04W 72/40*  (2023.01)
  *H04W 72/53*  (2023.01)
  *H04W 74/0808*  (2024.01)

(56) References Cited

U.S. PATENT DOCUMENTS

| | | | |
|---|---|---|---|
| 11,419,128 B2 * | 8/2022 | Wang | H04W 74/0808 |
| 11,483,800 B2 * | 10/2022 | Wang | H04W 72/02 |
| 2018/0098322 A1 | 4/2018 | Yoon | |

FOREIGN PATENT DOCUMENTS

| | | |
|---|---|---|
| EP | 3373679 A1 | 9/2018 |
| WO | 2016078905 A1 | 5/2016 |

OTHER PUBLICATIONS

Ericsson, "Discussion on Sidelink Operations for Pedestrian," 3GPP TSG-RAN WG2 #96, Reno, Nevada, Tdoc R2-168642, total 4 pages, 3rd Generation Partnership Project, Valbonne, France (Nov. 14-18, 2016).

Huawei, HiSilicon, "Discussion on the p. UE resource selection," 3GPP TSG RAN WG1 Meeting #86bis, Lisbon, Portugal, R1-1608649, total 5 pages, 3rd Generation Partnership Project, Valbonne, France (Oct. 10-14, 2016).

Samsung, "Discussion on congestion control," 3GPP TSG RAN WG1 Meeting #86, Gothenburg, Sweden, R1-166716, total 5 pages, 3rd Generation Partnership Project, Valbonne, France (Aug. 22-26, 2016).

Fujitsu, "Resource Allocation for NR V2X Sidelink Communication considering low latency requirement," 3GPP TSG RAN WG1 Meeting #94bis, Chengdu, China, R1-1810593, total 6 pages, 3rd Generation Partnership Project, Valbonne, France (Oct. 8-12, 2018).

NTT Docomo, Inc., "Reducing the maximum time between packet arrival and selected resource for data transmission," 3GPP TSG RAN WG1, Meeting #93, Busan, Korea, R1-1807047, Mobile Competence Centre, 650, Route Des Lucioles, F-06921 Sophia-Antipolis Cedex, France, XP051462112, 3rd Generation Partnership Project, Valbonne, France (May 21-25, 2018).

NTT Docomo, Inc., "Reducing the maximum time between packet arrival and selected resource for data transmission," 3GPP TSG RAN WG1 Meeting #92bis, Sanya, China, R1-1805025, Mobile Competence Centre, 650, Route Des Lucioles, F-06921 Sophia-Antipolis Cedex, France, XP05142726, 3rd Generation Partnership Project, Valbonne, France (Apr. 16-20, 2018).

Intel Corporation, "Resource Selection Latency Reduction for LTE V2V Sidelink Communication," 3GPP TSG WG1 Meeting #92bis, Sanya, China, R1-1804691-INTEL-V2X_LATENCY, Mobile Competence Centre, 650 Route Des Lucioles, F-06921 Sophia-Antipolis Cedex, France, XP051426958, Total 5 pages, 3rd Generation Partnership Project, Valbonne, France (Apr. 16-20, 2018).

Intel Corporation, "Transmitter Behavior for Sidelink Resource Re-Selection," 3GPP TSG RAN WG1 Meeting #85, Nanjing, China, R1-164137, INTEL-V2V Selection, Mobile Competence Centre 650, Route Des LUCIOLESF-06921 Sophia-Antipolis Cedex, Franc, XP051096577, Total 6 pages, 3rd Generation Partnership Project, Valbonne, France (May 23-27, 2016).

* cited by examiner

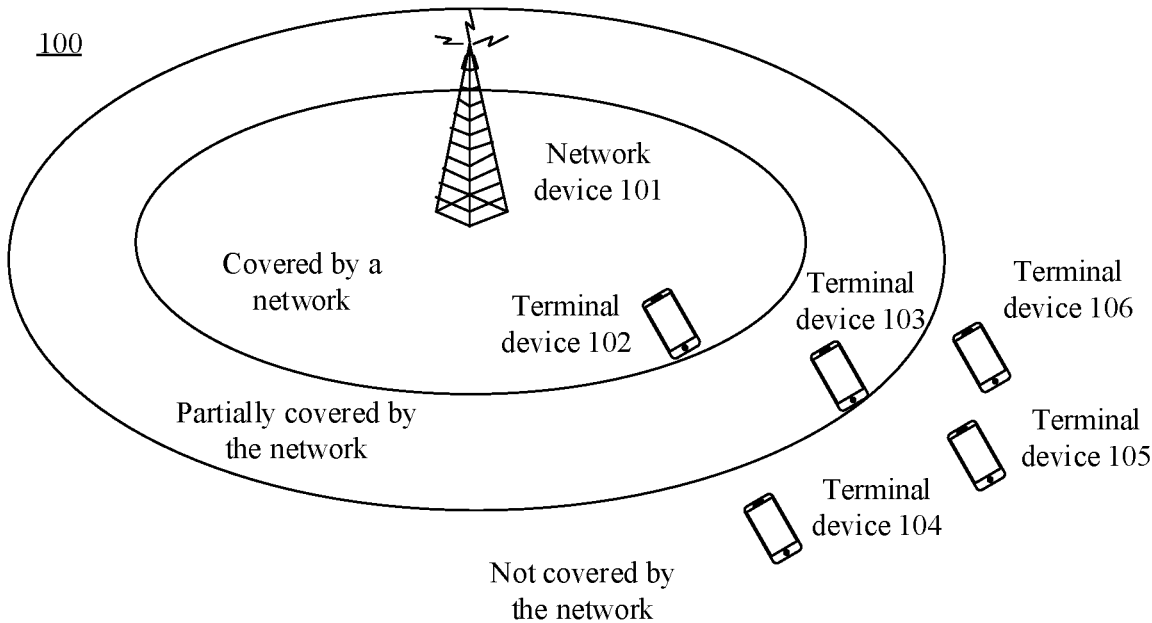

FIG. 1

| S210: A first terminal device determines a first parameter, where the first parameter is used to indicate a parameter of a sensing window, a parameter of a resource selection window, and/or a parameter of a first time window, and the first time window includes the sensing window and the resource selection window |

| S220: The first terminal device determines a first resource pool from at least one resource pool based on the first parameter |

| S230: The first terminal device selects a first resource from the first resource pool |

| S240: The first terminal device transmits sidelink information on the first resource |

FIG. 2

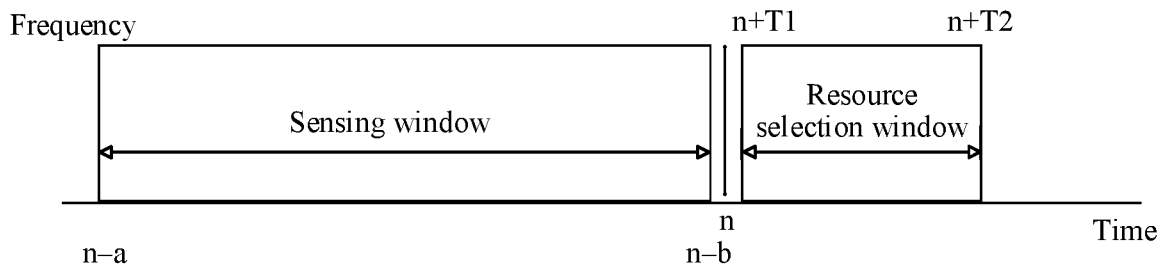

FIG. 3

S410: A first terminal device determines a first parameter, where the first parameter is used to indicate a parameter of a sensing window, a parameter of a resource selection window, and/or a parameter of a first time window, and the first time window includes the sensing window and the resource selection window S420: The first terminal device selects a first resource from a first resource pool based on the parameter of the first time window S430: The first terminal device transmits sidelink information on the first resource

FIG. 4

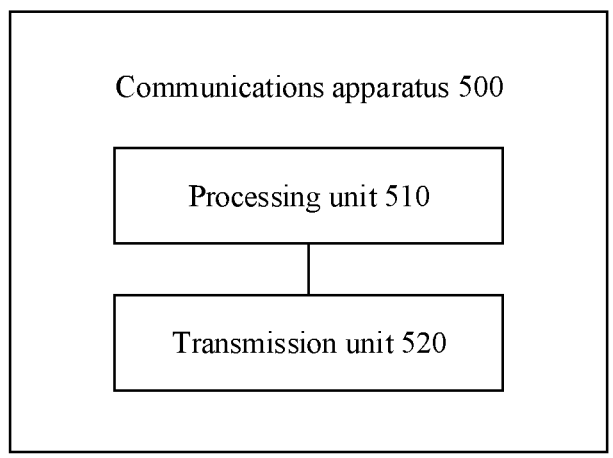

FIG. 5

COMMUNICATION METHOD AND COMMUNICATIONS APPARATUS FOR RESOURCE SELECTION

CROSS-REFERENCE TO RELATED APPLICATIONS

This application is a continuation of International Application No. PCT/CN2019/115150, filed on Nov. 1, 2019, which claims priority to Chinese Patent Application No. 201811300738.4, filed on Nov. 2, 2018. The disclosures of the aforementioned applications are hereby incorporated by reference in their entireties.

TECHNICAL FIELD

Embodiments of this application relate to the communications field, and more specifically, to a communication method and a communications apparatus.

BACKGROUND

Wireless communications technologies have undergone rapid development in the past, and have successively undergone a first generation wireless communications system based on an analog communications system, a 2G wireless communications system represented by a global system for mobile communications (GSM), a 3G wireless communications system represented by wideband code division multiple access (WCDMA), and a 4G wireless communications system represented by a long term evolution (LTE) wireless communications system that now has been widely put into commercial use in the world and has achieved great success. Services supported by the wireless communications system also developed from original voice and SMS messages to currently supported wireless high-speed data communication. Meanwhile, a quantity of wireless connections worldwide is continuously increasing at a high speed, and various new wireless service types also emerge in a large amount, for example, the internet of things and intelligent transportation. These impose a higher requirement on the wireless communications system.

Device-to-device (D2D) communication based on a cellular network is a new technology that allows, under control of a system, terminals to directly communicate with each other by reusing a cell resource. The technology can increase spectral efficiency of a cellular communications system and reduce transmit power of the terminals, and a problem of a lack of spectrum resources in a wireless communications system is resolved to some extent.

To improve security and intelligence of a transportation system, an idea of an intelligent transportation system gradually emerges. Recently, development of an intelligent transportation system mainly focuses on the field of an intelligent road transportation system, which is commonly referred to as vehicle-to-everything (V2X). Vehicle-to-vehicle (V2V), vehicle-to-pedestrian (V2P), and vehicle-to-infrastructure (V2I) are collectively referred to as V2X. These technologies allow vehicles to continuously communicate with all nearby vehicles and road infrastructures, for example, communicate with infrastructures such as traffic lights, campuses, and railway crossings. In a vehicle-to-everything system, when terminal devices communicate with each other, there are usually two resource allocation modes: One mode is that a network device schedules a resource, and the other mode is that the terminal device autonomously selects a resource. When the terminal device autonomously selects a resource, the terminal device needs to first sense (sensing) resources to identify available resources, and then selects a resource from the available resources for data transmission. A longer delay occurs in this process.

SUMMARY

Embodiments of this application provide a communication method and a communications apparatus, to reduce a data transmission delay and improve system communication efficiency.

According to a first aspect, a communication method is provided. The communication method includes: A first terminal device determines a first parameter, where the first parameter is used to indicate a parameter of a sensing window, a parameter of a resource selection window, and/or a parameter of a first time window, and the first time window includes the sensing window and the resource selection window. The first terminal device determines a first resource pool from at least one resource pool based on the first parameter. The first terminal device selects a first resource from the first resource pool. The first terminal device transmits sidelink information on the first resource.

According to the method in this embodiment of this application, the first terminal device selects the first resource pool from the at least one resource pool based on the first parameter, and selects a resource from the first resource pool for data transmission, so that a probability of a conflict occurring when the terminal device selects the resource can be reduced, thereby reducing a data transmission delay and improving system communication efficiency.

In a possible implementation, one resource pool in the at least one resource pool has a corresponding time window parameter, and a time window parameter corresponding to the first resource pool is the first parameter.

In a possible implementation, duration, indicated by the first parameter, of the resource selection window is greater than or equal to a processing delay of the first terminal device.

In a possible implementation, the duration, indicated by the first parameter, of the resource selection window is less than or equal to duration of the sensing window.

In a possible implementation, the duration, indicated by the first parameter, of the resource selection window is a smaller value in duration of a sensing window of the first resource pool and duration corresponding to a service delay requirement of the first terminal device.

In a possible implementation, the parameter, indicated by the first parameter, of the sensing window is determined based on a resource location of a control channel and/or a time domain length of the control channel.

In a possible implementation, duration, indicated by the first parameter, of the resource selection window is determined based on a sensing result.

In a possible implementation, that the first terminal device selects a first resource from the first resource pool includes: The duration of the sensing window of the first resource pool is greater than or equal to duration of a resource selection window of the first resource pool, the first terminal device selects the first resource from the first resource pool based on a sensing result of a first time period in the sensing window, and duration of the first time period is equal to the duration of the resource selection window of the first resource pool.

In a possible implementation, a start time of the first time period is a start time of the sensing window of the first resource pool.

In a possible implementation, that the first terminal device selects a first resource from the first resource pool includes: The duration of the sensing window of the first resource pool is less than or equal to duration of a resource selection window of the first resource pool, the first terminal device selects the first resource in a second time period in the resource selection window of the first resource pool based on a sensing result of the sensing window of the first resource pool, and duration of the second time period is equal to the duration of the sensing window of the first resource pool.

In a possible implementation, a start time of the second time period is a start time of the resource selection window of the first resource pool.

In a possible implementation, the first parameter includes at least one of the following parameters: a start time of the sensing window, an end time of the sensing window, a length of the sensing window, a start time of the resource selection window, an end time of the resource selection window, a length of the resource selection window, a start time of the first time window, an end time of the first time window, or a length of the first time window.

In a possible implementation, the method further includes: The first terminal device receives resource pool configuration information from a network device, where the resource pool configuration information is used to indicate the at least one resource pool and at least one time window parameter corresponding to the at least one resource pool.

According to a second aspect, this application provides a communication method. The communication method includes: A first terminal device determines a first parameter, where the first parameter is used to indicate a parameter of a sensing window, a parameter of a resource selection window, and/or a parameter of a first time window, and the first time window includes the sensing window and the resource selection window. The first terminal device selects a first resource from a first resource pool based on the first parameter. The first terminal device transmits sidelink information on the first resource.

According to the method in this embodiment of this application, duration of the sensing window, the resource selection window, and/or the first time window is in a unit of a slot or a symbol. Therefore, a delay of sensing a resource or selecting a resource by the terminal device from a resource pool can be reduced, thereby reducing a data transmission delay and improving system communication efficiency.

In a possible implementation, the duration of the sensing window, the resource selection window, and/or the first time window is in a unit of a slot or a symbol.

In a possible implementation, the parameter, indicated by the first parameter, of the sensing window is determined based on a resource location of a control channel and/or a time domain length of the control channel.

In a possible implementation, duration, indicated by the first parameter, of the resource selection window is determined based on a sensing result.

In a possible implementation, a sensing window of the first resource pool is located before a resource selection window of the first resource pool in time domain.

In a possible implementation, that the first terminal device selects a first resource from a first resource pool based on the first parameter includes: The duration of the sensing window of the first resource pool is greater than or equal to duration of the resource selection window of the first resource pool, the first terminal device selects the first resource from the first resource pool based on a sensing result of a first time period in the sensing window, and duration of the first time period is equal to the duration of the resource selection window of the first resource pool.

In a possible implementation, a start time of the first time period is a start time of the sensing window of the first resource pool.

In a possible implementation, that the first terminal device selects a first resource from a first resource pool based on the first parameter includes: The duration of the sensing window of the first resource pool is less than or equal to duration of the resource selection window of the first resource pool, the first terminal device selects the first resource in a second time period in the resource selection window of the first resource pool based on a sensing result of the sensing window of the first resource pool, and duration of the second time period is equal to the duration of the sensing window of the first resource pool.

In a possible implementation, a start time of the second time period is a start time of the resource selection window of the first resource pool.

In a possible implementation, the first parameter includes at least one of the following parameters: a start time of the sensing window, an end time of the sensing window, a length of the sensing window, a start time of the resource selection window, an end time of the resource selection window, a length of the resource selection window, a start time of the first time window, an end time of the first time window, or a length of the first time window.

In a possible implementation, the sensing window of the first resource pool is a periodic sensing window, or the resource selection window of the first resource pool is a periodic resource selection window, or a first time window of the first resource pool is a periodic first time window.

According to a third aspect, this application provides a communications apparatus. The apparatus includes: a processing unit, configured to determine a first parameter, where the first parameter is used to indicate a parameter of a sensing window, a parameter of a resource selection window, and/or a parameter of a first time window, and the first time window includes the sensing window and the resource selection window, where the processing unit is configured to determine a first resource pool from at least one resource pool based on the first parameter; and the processing unit is configured to select a first resource from the first resource pool; and a transmission unit, configured to transmit sidelink information on the first resource.

According to the apparatus in this embodiment of this application, the communications apparatus selects the first resource pool from the at least one resource pool based on the first parameter, and selects a resource from the first resource pool for data transmission, so that a probability of a conflict occurring when the communications apparatus selects the resource can be reduced, thereby reducing a data transmission delay and improving system communication efficiency.

In a possible implementation, one resource pool in the at least one resource pool has a corresponding time window parameter, and a time window parameter corresponding to the first resource pool is the first parameter.

In a possible implementation, duration, indicated by the first parameter, of the resource selection window is greater than or equal to a processing delay of the first terminal device.

In a possible implementation, the duration, indicated by the first parameter, of the resource selection window is less than or equal to duration of the sensing window.

In a possible implementation, the duration, indicated by the first parameter, of the resource selection window is a smaller value in duration of a sensing window of the first resource pool and duration corresponding to a service delay requirement of the first terminal device.

In a possible implementation, the parameter, indicated by the first parameter, of the sensing window is determined based on a resource location of a control channel and/or a time domain length of the control channel.

In a possible implementation, duration, indicated by the first parameter, of the resource selection window is determined based on a sensing result.

In a possible implementation, that the processing unit is configured to select a first resource from the first resource pool includes: Duration of the sensing window of the first resource pool is greater than or equal to duration of a resource selection window of the first resource pool, the processing unit is configured to select the first resource from the first resource pool based on a sensing result of a first time period in the sensing window, and duration of the first time period is equal to the duration of the resource selection window of the first resource pool.

In a possible implementation, a start time of the first time period is a start time of the sensing window of the first resource pool.

In a possible implementation, that the processing unit is configured to select a first resource from the first resource pool includes: Duration of the sensing window of the first resource pool is less than or equal to duration of a resource selection window of the first resource pool, the processing unit is configured to select the first resource in a second time period in the resource selection window of the first resource pool based on a sensing result of the sensing window of the first resource pool, and duration of the second time period is equal to the duration of the sensing window of the first resource pool.

In a possible implementation, a start time of the second time period is a start time of the resource selection window of the first resource pool.

In a possible implementation, the first parameter includes at least one of the following parameters: a start time of the sensing window, an end time of the sensing window, a length of the sensing window, a start time of the resource selection window, an end time of the resource selection window, a length of the resource selection window, a start time of the first time window, an end time of the first time window, or a length of the first time window.

In a possible implementation, the transmission module is further configured to: receive resource pool configuration information from a network device, where the resource pool configuration information is used to indicate the at least one resource pool and at least one time window parameter corresponding to the at least one resource pool.

The modules included in the apparatus in the third aspect may be implemented in a manner of software and/or hardware.

For example, the modules included in the apparatus in the third aspect may be implemented by using a processor. To be specific, the apparatus in the third aspect may include a processor, and the processor is configured to execute program instructions, to implement functions that can be implemented by the modules included in the apparatus.

Optionally, the apparatus in the third aspect may further include a memory, and the memory is configured to: store the program instructions executed by the processor, and even store data.

Optionally, the apparatus in the third aspect may be a chip that can be integrated into a smart device. In this case, the apparatus may further include a communications interface.

According to a fourth aspect, a communications apparatus is provided. The apparatus includes: a processing unit, configured to determine a first parameter, where the first parameter is used to indicate a parameter of a sensing window, a parameter of a resource selection window, and/or a parameter of a first time window, and the first time window includes the sensing window and the resource selection window, where the processing unit is configured to select a first resource from a first resource pool based on the first parameter; and a transmission unit, configured to transmit sidelink information on the first resource.

According to the apparatus in this embodiment of this application, duration of the sensing window, the resource selection window, and/or the first time window is in a unit of a slot or a symbol. Therefore, a delay of sensing a resource or selecting a resource by the terminal device from a resource pool can be reduced, thereby reducing a data transmission delay and improving system communication efficiency.

In a possible implementation, the duration of the sensing window, the resource selection window, and/or the first time window is in a unit of a slot or a symbol.

In a possible implementation, the parameter, indicated by the first parameter, of the sensing window is determined based on a resource location of a control channel and/or a time domain length of the control channel.

In a possible implementation, duration, indicated by the first parameter, of the resource selection window is determined based on a sensing result.

In a possible implementation, a sensing window of the first resource pool is located before a resource selection window of the first resource pool in time domain.

In a possible implementation, that the processing unit is configured to select a first resource from a first resource pool based on the first parameter includes: Duration of the sensing window of the first resource pool is greater than or equal to duration of the resource selection window of the first resource pool, the processing unit is configured to select the first resource from the first resource pool based on a sensing result of a first time period in the sensing window, and duration of the first time period is equal to the duration of the resource selection window of the first resource pool.

In a possible implementation, a start time of the first time period is a start time of the sensing window of the first resource pool.

In a possible implementation, that the processing unit is configured to select a first resource from a first resource pool based on the first parameter includes: Duration of the sensing window of the first resource pool is less than or equal to duration of the resource selection window of the first resource pool, the processing unit is configured to select the first resource in a second time period in the resource selection window of the first resource pool based on a sensing result of the sensing window of the first resource pool, and duration of the second time period is equal to the duration of the sensing window of the first resource pool.

In a possible implementation, a start time of the second time period is a start time of the resource selection window of the first resource pool.

In a possible implementation, the first parameter includes at least one of the following parameters: a start time of the sensing window, an end time of the sensing window, a length of the sensing window, a start time of the resource selection window, an end time of the resource selection window, a length of the resource selection window, a start time of the first time window, an end time of the first time window, or a length of the first time window.

In a possible implementation, the sensing window of the first resource pool is a periodic sensing window, or the resource selection window of the first resource pool is a periodic resource selection window, or a first time window of the first resource pool is a periodic first time window.

The modules included in the apparatus in the fourth aspect may be implemented in a manner of software and/or hardware.

For example, the modules included in the apparatus in the fourth aspect may be implemented by using a processor. To be specific, the apparatus in the fourth aspect may include a processor, and the processor is configured to execute program instructions, to implement functions that can be implemented by the modules included in the apparatus.

Optionally, the apparatus in the fourth aspect may further include a memory, and the memory is configured to: store the program instructions executed by the processor, and even store data.

Optionally, the apparatus in the fourth aspect may be a chip that can be integrated into a smart device. In this case, the apparatus may further include a communications interface.

According to a fifth aspect, this application provides a computer-readable storage medium. The computer-readable storage medium stores program code to be executed by a communications apparatus. The program code includes instructions used to perform the method according to any one of the first aspect or the possible implementations of the first aspect.

According to a sixth aspect, this application provides a computer-readable storage medium. The computer-readable storage medium stores program code to be executed by a communications apparatus. The program code includes instructions used to perform the method according to any one of the second aspect or the possible implementations of the second aspect.

According to a seventh aspect, this application provides a computer program product including instructions. When the computer program product runs on a communications apparatus, the communications apparatus is enabled to perform the method according to any one of the first aspect or the possible implementations of the first aspect.

According to an eighth aspect, this application provides a computer program product including instructions. When the computer program product runs on a communications apparatus, the communications apparatus is enabled to perform the method according to any one of the second aspect or the possible implementations of the second aspect.

According to the method in the embodiments of this application, the first terminal device selects the first resource pool from the at least one resource pool based on the first parameter, and selects the resource from the first resource pool for data transmission, so that the probability of the conflict occurring when the terminal device selects the resource can be reduced, thereby reducing the data transmission delay and improving the system communication efficiency.

BRIEF DESCRIPTION OF DRAWINGS

FIG. 1 is a schematic diagram of a communications system used in an embodiment of this application;
FIG. 2 is a schematic flowchart of a communication method according to an embodiment of this application;
FIG. 3 is a schematic diagram of a time window according to an embodiment of this application;
FIG. 4 is a schematic flowchart of a communication method according to an embodiment of this application;
FIG. 5 is a schematic structural diagram of a communications apparatus according to an embodiment of this application.

DESCRIPTION OF EMBODIMENTS

Figure 6:
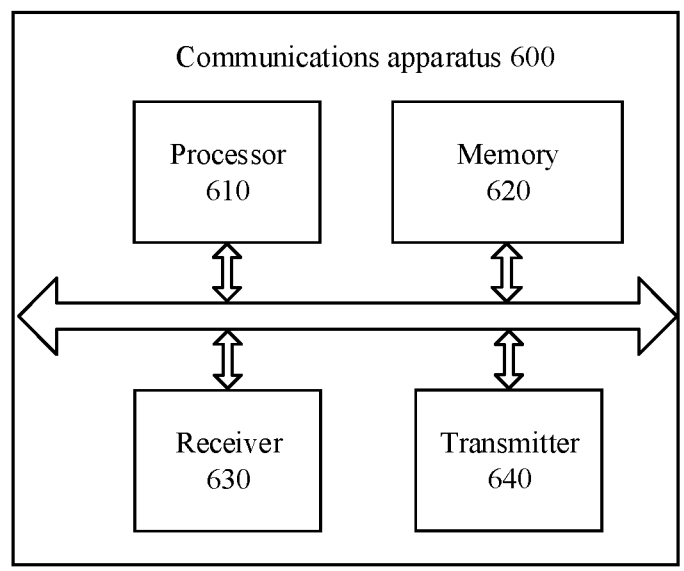
FIG. 6 is a schematic structural diagram of a communications apparatus according to another embodiment of this application.

The following describes technical solutions of this application with reference to accompanying drawings.

It should be understood that the technical solutions in embodiments of this application may be applied to various communications systems, for example, a global system for mobile communications (GSM), a code division multiple access (CDMA) system, a wideband code division multiple access (WCDMA) system, a general packet radio service (GPRS) system, a long term evolution (LTE) system, and a new radio (NR) system.

It should be further understood that, in the embodiments of this application, a terminal device may also refer to user equipment (UE), an access terminal, a subscriber unit, a subscriber station, a mobile station, a mobile station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN) network, or the like.

It should be understood that in the embodiments of this application, the terminal device may be a communications terminal or an in-vehicle communications device installed in a car, or may be another modular and detachable in-vehicle terminal that can implement a communication function. In terms of functions, the terminal device needs to implement information communication of services such as vehicle-to-vehicle (V2V), vehicle-to-pedestrian (V2P), and vehicle-to-infrastructure (V2I) services. These services may be collectively referred to as a V2X service. Therefore, the V2X service in the embodiments of this application may include one or more of the following services: the V2V service, the V2I service, and the vehicle-to-pedestrian V2P service.

In some embodiments, the terminal device mentioned in this application may alternatively be a wearable device. The wearable device may also be referred to as a wearable intelligent device, and is a generic term for wearable devices such as glasses, gloves, watches, clothes, and shoes that are developed by applying wearable technologies to intelligent designs of daily wear. The wearable device is a portable device that can be directly worn on a body or integrated into clothes or an accessory of a user. The wearable device is not only a hardware device, but is used to implement powerful functions through software support, data exchange, and cloud interaction. Generalized wearable intelligent devices include full-featured and large-size devices that can implement complete or partial functions without depending on smartphones, for example, smartwatches or smart glasses, and devices that focus on only one type of application function and need to work with other devices such as smartphones, for example, various smart bands or smart jewelry for monitoring physical signs.

It should be understood that in the embodiments of this application, a network device may be a device that is located on a network side and that communicates with the terminal device. The network device may be a base transceiver station (BTS) in a GSM or in CDMA, or may be a NodeB (NB) in a WCDMA system, or may be an evolved NodeB (evolutional Node B, eNB, or eNodeB) in an LTE system, or may be a next generation NodeB (gNB) in a future 5G network, or may be a wireless controller in a cloud radio access network (CRAN) scenario. Alternatively, the network device may be a relay station, an access point, a network device in a future 5G network, a network device in a future evolved public land mobile network (PLMN), or the like.

FIG. 1 is a schematic diagram of a communications system 100 used in an embodiment of this application. In an application scenario in FIG. 1, the communications system 100 may include a network device 101 and terminal devices 102, 103, 104, 105, and 106. The network device may be connected to the terminal devices in a wireless manner, and the terminal devices may be connected to each other in a wireless manner. It should be understood that FIG. 1 is described merely by using an example in which the system includes five terminal devices. However, this embodiment of this application is not limited thereto. For example, the communications system 100 may further include more terminal devices. Similarly, the system may also include more network devices. This is not limited in this embodiment of this application.

In the application scenario shown in FIG. 1, D2D communication may be performed between the terminal devices, and a communications link between the terminal devices may be referred to as a sidelink. Release 14 of the 3rd generation partnership project (3GPP) defines a V2X link (for example, may include at least one of the following links: a V2V link, a V2I link, and a V2P link) that is enhanced based on a D2D link. The D2D link and the V2X link may communicate with each other by using different interfaces.

As shown in FIG. 1, D2D communication may be classified into three types: D2D communication that is covered by a network, D2D communication that is partially covered by a network, and D2D communication that is not covered by a network. For example, the terminal device 102 in FIG. 1 is within coverage of the network device 101, and can receive a signal of the network device 101. That is, the terminal device 102 is covered by the network, and may be referred to as a terminal device within network coverage. The terminal device 103 is not within coverage of the network device 101, but the terminal device 103 can receive a signal of the terminal device 102 that is within network coverage. Therefore, the terminal device 103 is partially covered by the network, and may be referred to as a terminal device partially within network coverage. The terminal devices 104, 105, and 106 are not within coverage of the network device 101, and the terminal devices 104, 105, and 106 cannot receive the signal of the terminal device 102 that is within network coverage. In this case, the terminal devices 104, 105, and 106 are not covered by the network, and may be referred to as terminal devices beyond network coverage.

There may be two resource allocation manners for the terminal device on the sidelink. One manner is a mode 3 in which the network device allocates a resource to the terminal device, and the other manner is a mode 4 in which the terminal device autonomously selects an available resource. Usually, the network system may include more than one terminal device. The mode 3 may be used for a terminal device that is covered by the network, for example, the terminal device 102 in FIG. 1. The mode 4 may be used for a terminal device that is not covered by the network, for example, the terminal devices 104, 105, and 106 in FIG. 1. In a conventional technology, the terminal device for which the mode 4 is used may obtain a sending resource from a resource pool in a contention manner. The resource pool may be a block of resource that is configured by the network device or that is pre-configured. The terminal device for which the mode 4 is used may contend for the resource in the resource pool. Before transmitting data, the terminal device needs to sense resources, to identify available resources and unavailable resources, and then selects the resource from the available resources for data transmission. Because the terminal device obtains the resource in the contention manner, there is a relatively high probability that two or more terminal devices select a same block of resource, and a conflict easily occurs. Consequently, a relatively high delay is generated during data transmission.

Based on this, the embodiments of this application provide a communication method, to reduce a data transmission delay and improve system communication efficiency. FIG. 2 is a schematic flowchart of a communication method according to an embodiment of this application.

The communication method shown in FIG. 2 may include step 210, step 220, step 230, and step 240.

S210: A first terminal device determines a first parameter, where the first parameter is used to indicate a parameter of a sensing window, a parameter of a resource selection window, and/or a parameter of a first time window, and the first time window includes the sensing window and the resource selection window.

That the first time window includes the sensing window and the resource selection window may be understood as that duration of the first time window is not less than a sum of duration of the sensing window and duration of the resource selection window. In other words, the first time window includes the sensing window and the resource selection window.

In a possible implementation in this embodiment of this application, the first parameter may include at least one of the following parameters: a start time of the sensing window, an end time of the sensing window, a length of the sensing window, a start time of the resource selection window, an end time of the resource selection window, a length of the resource selection window, a start time of the first time window, an end time of the first time window, or a length of the first time window.

S220: The first terminal device determines a first resource pool from at least one resource pool based on the first parameter.

One resource pool in the at least one resource pool may have a corresponding time window parameter, and a time window parameter corresponding to the first resource pool is the first parameter.

In a possible implementation in this embodiment of this application, the at least one resource pool may be one resource pool. In this case, the first terminal device may select the resource pool as the first resource pool.

In this embodiment of this application, that one resource pool in the at least one resource pool has a corresponding time window parameter may be understood as that the resource pool in the at least one resource pool is in a one-to-one correspondence with the time window parameter.

As shown in FIG. 3, before transmitting data, the first terminal device may perform sensing in a sensing window, to identify available resources and unavailable resources, and then selects a resource in a resource selection window for data transmission. As shown in FIG. 3, a start time of the sensing window is n−a, an end time of the sensing window is n−b, a start time of the resource selection window is n+T1, and an end time of the resource selection window is n+T2, where n, a, b, T1, and T2 are all positive integers, n≥a, and n>b.

In this embodiment of this application, at least one resource pool may be predefined. For example, the at least one resource pool may have separate configurations independent of each other. Optionally, different resource pools in the at least one resource pool may correspond to different time window parameters.

For example, the first parameter is used to indicate the resource selection window, and the first parameter includes the start time and the end time of the resource selection window. Three resource pools may be preconfigured, and respectively correspond to different resource selection windows. For example, it is assumed that the resource selection window in FIG. 3 corresponds to a case in which T1=5 and 20≤T2<100. As shown in the following table, three resource pools may be preconfigured, and respectively correspond to end times of different resource selection windows.

TABLE 1

A possible resource pool configuration method

| Resource pool | Start time | End time |
| --- | --- | --- |
| Resource pool 1 | T1 = 3 | 20 ≤ T2 < 50 |
| Resource pool 2 | T1 = 3 | 50 ≤ T2 < 80 |
| Resource pool 3 | T1 = 3 | 80 ≤ T2 < 100 |

It should be understood that start times of resource selection windows in Table 1 may be the same. In this case, the start times of the resource selection windows may also be preset. In other words, the time window parameter of the resource pool may be used to indicate only the end time of the resource selection window, and the first terminal device may determine the first resource pool by using the preset start times of the resource selection windows.

Optionally, the start times of the resource selection windows in Table 1 may be different. It should be understood that parameters of sensing windows corresponding to resource pools may also be different. Correspondingly, parameters of first time windows are also different. In this embodiment of this application, a case in which the first parameter is used to indicate the sensing window and the first time window is similar to this case. Details are not described herein again.

Optionally, the first parameter may include the end time of the resource selection windows. For example, using the resource pool configuration method in Table 1 as an example, the first terminal device may determine the first parameter, namely, the end time of the resource selection window. The first terminal device may select, from the three resource pools in Table 1, a resource pool corresponding to the end time of the resource selection window as the first resource pool. To be specific, if the end time of the resource selection window falls within a range of a specific end time in Table 1, the resource pool corresponding to the end time is used as the first resource pool.

In this embodiment of this application, the sensing window indicated by the first parameter may be an independent sensing window, or may be a sensing window included in the first time window. The resource selection window indicated by the first parameter may be an independent resource selection window, or may be a resource selection window included in the first time window.

Optionally, duration, indicated by the first parameter, of the resource selection window may be greater than or equal to a processing delay of the first terminal device. The processing delay herein may be a delay in processing a sensing result by the first terminal device, or a delay in preparing to-be-sent data by the first terminal device.

Optionally, the duration, indicated by the first parameter, of the resource selection window may be less than or equal to duration of a sensing window of the first resource pool.

Optionally, the duration, indicated by the first parameter, of the resource selection window may be a smaller value in the duration of the sensing window of the first resource pool and duration corresponding to a service delay requirement of the first terminal device.

Optionally, the parameter, indicated by the first parameter, of the sensing window may be determined based on a resource location of a control channel and/or a time domain length of the control channel.

In this embodiment of this application, the first terminal device may receive resource pool configuration information from a network device, where the resource pool configuration information is used to indicate the at least one resource pool and at least one time window parameter corresponding to the at least one resource pool.

In this embodiment of this application, the network device may send a resource pool configuration message by using a master information block (MIB), a system information block (SIB), radio resource control (RRC) signaling, media access control (MAC) layer signaling, and physical layer signaling (for example, downlink control information (DCI)).

In this embodiment of this application, the network device may send configuration information of a bandwidth part (BWP) or configuration information of a carrier to the first terminal device. The configuration information of the BWP or of the carrier carries the resource pool configuration information.

It should be noted that the resource pool in this embodiment of this application may alternatively be a BWP. For example, the resource pool may be a BWP used for sidelink transmission. Alternatively, the resource pool in this embodiment of this application may be a resource pool in a BWP, or may be a resource pool in a carrier.

Optionally, the network device may configure different resource pools for different terminal devices, or may configure a same resource pool for a plurality of terminal devices.

Optionally, the resource pool configuration information may be used to indicate a time window parameter of a resource pool in a specific time period. After the time period, the network device may resend the resource pool configuration information to the first terminal device. Alternatively, the network device may resend the resource pool configuration information to the first terminal device after being triggered by a condition or an action.

Optionally, duration of a sensing window, a resource selection window, and/or a first time window, of a first resource pool in the at least one resource pool, may be in a unit of a slot or a symbol.

Optionally, a sensing window of a second resource pool in the at least one resource pool may be a periodic sensing window, or a resource selection window of a second resource pool in the at least one resource pool may be a periodic resource selection window, or a first time window of a second resource pool in the at least one resource pool may be a periodic first time window. The second resource pool in the at least one resource pool herein may be the first resource pool.

Optionally, the sensing window may be located at the beginning of a periodicity. It is assumed that the periodicity P=50 milliseconds (ms), and the terminal device may perform sensing in the first 10 ms of every 50 ms.

Optionally, the resource selection window may be located at the end of a periodicity. It is assumed that the periodicity P=50 ms, and the terminal device may perform resource selection in the last 10 ms of every 50 ms.

Optionally, a maximum value of the duration of the resource selection window may be duration in a sensing periodicity other than duration of the sensing window.

The sensing periodicity may be configured by the network device for the terminal device, or may be set by the terminal device based on a service periodicity.

In this embodiment of this application, duration of a resource selection window of the first resource pool may be determined based on the sensing result.

In a possible implementation, the duration of the resource selection window of the first resource pool or the resource selection window in the first time window may be determined based on a proportion of available resources in the sensing result. If the proportion of the available resources in the sensing result is relatively small, for example, less than or equal to 20%, a resource selection window with relatively short duration may be selected. If the proportion of the available resources in the sensing result is relatively large, for example, greater than 20%, a resource selection window with relatively long duration may be selected. Optionally, if the first terminal device fails in contention, duration of a next resource selection window may be increased. If the first terminal device succeeds in contention, duration of a next resource selection window may be reduced.

S230: The first terminal device selects a first resource from the first resource pool.

In a possible implementation, the first parameter of the first resource pool may include the parameter of the first time window, and the first time window includes the sensing window and the resource selection window. For example, the first terminal device may determine the duration of the sensing window of the first resource pool based on the sensing result, and the first terminal device may determine the duration of the resource selection window of the first resource pool based on the parameter of the first time window and the duration of the sensing window of the first resource pool. In this case, the first terminal device may select the first resource in the resource selection window of the first resource pool.

In another possible implementation, the duration of the sensing window of the first resource pool may be greater than or equal to the duration of the resource selection window of the first resource pool. The first terminal device may select the first resource in the resource selection window of the first resource pool based on a sensing result of a first time period in the sensing window. In this case, duration of the first time period may be equal to the duration of the resource selection window of the first resource pool.

Optionally, a start time of the first time period may be a start time of the sensing window of the first resource pool.

In another possible implementation, the duration of the sensing window of the first resource pool may be less than or equal to the duration of the resource selection window of the first resource pool. The first terminal device selects the first resource in a second time period in the resource selection window of the first resource pool based on a sensing result of the sensing window of the first resource pool. Duration of the second time period is equal to the duration of the sensing window of the first resource pool.

Optionally, a start time of the second time period may be a start time of the resource selection window of the first resource pool.

S240: The first terminal device transmits sidelink information on the first resource.

The sidelink information may be specifically a sidelink channel or a sidelink signal, and may include resource selection of a physical sidelink control channel (physical sidelink control channel, PSCCH), resource selection of a physical sidelink shared channel (physical sidelink shared channel, PSSCH), resource selection of a physical sidelink feedback channel (physical sidelink feedback channel, PSFCH), resource selection of a physical sidelink discovery channel (physical sidelink discovery channel, PSDCH), or resource selection of a physical sidelink broadcast channel (physical sidelink broadcast channel, PSBCH), or may be used for another channel or signal.

That the first terminal device transmits sidelink information on the first resource may be that the first terminal device transmits the sidelink information with a second terminal device, or may be that the first terminal device transmits the sidelink information with a plurality of second terminal devices. The method in this embodiment of this application may be used in a unicast scenario, may be used in a multicast scenario, and may further be used in a broadcast scenario. For example, in the unicast scenario, a terminal device 0 (transmit end) sends information on a link A, and a terminal device 1 (receive end) may receive the information on the link A. In the multicast scenario, the terminal device 0 sends information on the link A, and a terminal device 2 (receive end) and a terminal device 3 (receive end) that are in a same group as the terminal device 0 may receive the information on the link A. In the broadcast scenario, the terminal device 0 sends information on the link A, and any terminal device that can receive information from the terminal device 0 may receive the information on the link A.

In the unicast scenario, the transmit end may establish links to a plurality of receive ends. For example, for a terminal device 0 at a transmit end, the terminal device 0 may independently communicate with a plurality of terminal devices. For another example, the terminal device 0 and a terminal device 1 may establish a link A. The terminal device 0 sends information on the link A, and the terminal device 1 receives the information on the link A. The terminal device 0 and a terminal device 2 establish a link B. The terminal device 0 sends information on the link B, and the terminal device 2 receives the information on the link B.

The communication method in FIG. 2 may be used for the resource selection of the physical sidelink control channel PSCCH, or may be used for the resource selection of the physical sidelink shared channel PSSCH, or may be used for the resource selection of the physical sidelink feedback channel PSFCH, or may be used for the resource selection of the physical sidelink discovery channel PSDCH, or may be used for the resource selection of the physical sidelink broadcast channel PSBCH, or may be used for the resource selection of the another channel or signal. This is not limited in this embodiment of this application.

FIG. 4 is a schematic flowchart of a communication method according to an embodiment of this application. The communication method shown in FIG. 4 may include step 410, step 420, and step 430.

S410: A first terminal device determines a first parameter, where the first parameter is used to indicate a parameter of a sensing window, a parameter of a resource selection window, and/or a parameter of a first time window, and the first time window includes the sensing window and the resource selection window.

That the first time window includes the sensing window and the resource selection window may be understood as that duration of the first time window is not less than a sum of duration of the sensing window and duration of the resource selection window. In other words, the first time window includes the sensing window and the resource selection window.

The duration of the sensing window, the resource selection window, and/or the first time window is in a unit of a slot or a symbol. In this embodiment of this application, for a subcarrier spacing of 15 kilohertz (kHz), a slot may be 1 ms. For a normal cyclic prefix (NCP), a slot may include 14 symbols, and for an extended cyclic prefix (ECP), a slot may include 12 symbols.

Optionally, when the duration of the sensing window, the resource selection window, and/or the first time window is in a unit of a slot, the duration of the sensing window, the resource selection window, and/or the first time window is at least one slot.

Optionally, when the duration of the sensing window, the resource selection window, and/or the first time window is in a unit of a symbol, the duration of the sensing window, the resource selection window, and/or the first time window is at least one symbol.

In a possible implementation in this embodiment of this application, the first parameter may include at least one of the following parameters: a start time of the sensing window, an end time of the sensing window, a length of the sensing window, a start time of the resource selection window, an end time of the resource selection window, a length of the resource selection window, a start time of the first time window, an end time of the first time window, or a length of the first time window.

In this embodiment of this application, duration, indicated by the first parameter, of the resource selection window may be greater than or equal to a processing delay of the first terminal device. The processing delay herein may be a delay in processing a sensing result by the first terminal device, or a delay in preparing to-be-sent data by the first terminal device.

Optionally, the duration, indicated by the first parameter, of the resource selection window may be less than or equal to duration of a sensing window of the first resource pool.

Optionally, the duration, indicated by the first parameter, of the resource selection window may be a smaller value in the duration of the sensing window of the first resource pool and duration corresponding to a service delay requirement of the first terminal device.

Optionally, the parameter, indicated by the first parameter, of the sensing window may be determined based on a resource location of a control channel and/or a time domain length of the control channel.

In this embodiment of this application, the first terminal device may receive resource pool configuration information from a network device, where the resource pool configuration information is used to indicate a window parameter corresponding to the first resource pool.

In this embodiment of this application, the network device may send a resource pool configuration message by using a master information block MIB, a system information block SIB, radio resource control RRC signaling, media access control MAC layer signaling, and physical layer signaling (for example, DCI).

In this embodiment of this application, the network device may send configuration information of a BWP or of a carrier to the first terminal device, where the configuration information of the BWP or of the carrier carries the resource pool configuration information.

It should be noted that the resource pool in this embodiment of this application may alternatively be a BWP. For example, the resource pool may be a BWP used for sidelink transmission. Alternatively, the resource pool in this embodiment of this application may be a resource pool in a BWP, or may be a resource pool in a carrier.

Optionally, the network device may configure different resource pools for different terminal devices, or may configure a same resource pool for a plurality of terminal devices.

Optionally, the resource pool configuration information may be used to indicate a time window parameter of a resource pool in a specific time period. After the time period, the network device may resend the resource pool configuration information to the first terminal device. Alternatively, the network device may resend the resource pool configuration information to the first terminal device after being triggered by a condition or an action.

Optionally, the duration of the sensing window, the resource selection window, and/or the first time window, of the first resource pool, may be in a unit of a slot or a symbol.

Optionally, the network device may configure configuration information of a plurality of resource pools for the first terminal device.

For example, the resource pool configuration information is used to indicate a symbol-level resource selection window. Three resource pools may be preconfigured, and respectively correspond to different resource selection windows. As shown in FIG. 2, three resource pools may be preconfigured, and respectively correspond to resource granularities of different resource selection windows.

TABLE 2

Another possible resource pool configuration method

| Resource pool | Resource granularity |
|---|---|
| Resource pool 1 | 1 to 3 symbols |
| Resource pool 2 | 4 to 7 symbols |
| Resource pool 3 | More than 7 symbols |

In this embodiment of this application, a case in which the first parameter is used to indicate the sensing window and the first time window is similar to this case. Details are not described herein again.

Optionally, the sensing window of the first resource pool may be a periodic sensing window, or the resource selection window of the first resource pool may be a periodic resource selection window, or the first time window of the first resource pool may be a periodic first time window.

Optionally, the sensing window may be located at the beginning of a periodicity. It is assumed that the periodicity P=20 ms, and the terminal device may perform sensing in the first L1 slots of every 20 ms. It is assumed that the periodicity P=1 slot, for example, 14 symbols, and the terminal device may perform sensing in the first L1 symbols of a slot. L1 herein is a positive integer.

Optionally, the resource selection window may be located at the end of a periodicity. It is assumed that the periodicity P=20 ms, and the terminal device may perform resource selection in the last L1 slots of every 20 ms. It is assumed that the periodicity P=1 slot, for example, 14 symbols, and the terminal device may perform resource selection in the last L1 symbols of a slot.

Optionally, a maximum value of the duration of the resource selection window may be duration in a sensing periodicity other than duration of the sensing window.

The sensing periodicity may be configured by the network device for the terminal device, or may be set by the terminal device based on a service periodicity.

In this embodiment of this application, the duration of the resource selection window of the first resource pool may be determined based on the sensing result.

In a possible implementation, the duration of the resource selection window of the first resource pool or the resource selection window in the first parameter may be determined based on a proportion of available resources in the sensing result. If the proportion of the available resources in the sensing result is relatively small, for example, less than or equal to 20%, a resource selection window with relatively short duration may be selected. If the proportion of the available resources in the sensing result is relatively large, for example, greater than 20%, a resource selection window with relatively long duration may be selected. Optionally, if the first terminal device fails in contention, duration of a next resource selection window may be increased. If the first terminal device succeeds in contention, duration of a next resource selection window may be reduced.

S420: The first terminal device selects a first resource from the first resource pool based on the first parameter.

In a possible implementation, the first parameter of the first resource pool may include the parameter of the first time window, and the first time window includes the sensing window and the resource selection window. For example, the first terminal device may determine the duration of the sensing window of the first resource pool based on the sensing result, and the first terminal device may determine the duration of the resource selection window of the first resource pool based on the parameter of the first time window and the duration of the sensing window of the first resource pool. In this case, the first terminal device may select the first resource in the resource selection window of the first resource pool.

In another possible implementation, the duration of the sensing window of the first resource pool may be greater than or equal to the duration of the resource selection window of the first resource pool. The first terminal device may select the first resource in the resource selection window of the first resource pool based on a sensing result of a first time period in the sensing window. In this case, duration of the first time period may be equal to the duration of the resource selection window of the first resource pool.

Optionally, a start time of the first time period may be a start time of the sensing window of the first resource pool.

Optionally, the duration of the first time period is at least one slot or one symbol.

In another possible implementation, the duration of the sensing window of the first resource pool may be less than or equal to the duration of the resource selection window of the first resource pool. The first terminal device selects the first resource in a second time period in the resource selection window of the first resource pool based on a sensing result of the sensing window of the first resource pool. Duration of the second time period is equal to the duration of the sensing window of the first resource pool.

Optionally, a start time of the second time period may be a start time of the resource selection window of the first resource pool.

Optionally, the duration of the first time period is at least one slot or one symbol.

S430: The first terminal device transmits sidelink information on the first resource.

The sidelink information may be specifically a sidelink channel or a sidelink signal, and may include resource selection of a physical sidelink control channel PSCCH, resource selection of a physical sidelink shared channel PSSCH, resource selection of a physical sidelink feedback channel PSFCH, resource selection of a physical sidelink discovery channel PSDCH, resource selection of a physical sidelink broadcast channel PSBCH, or another channel or signal.

That the first terminal device transmits sidelink information on the first resource may be that the first terminal device transmits the sidelink information with a second terminal device, or may be that the first terminal device transmits the sidelink information with a plurality of second terminal devices. The method in this embodiment of this application may be used in a unicast scenario, may be used in a multicast scenario, and may further be used in a broadcast scenario. For example, in the unicast scenario, a terminal device 0 (transmit end) sends information on a link A, and a terminal device 1 (receive end) may receive the information on the link A. In the multicast scenario, the terminal device 0 sends information on the link A, and a terminal device 2 (receive end) and a terminal device 3 (receive end) that are in a same group as the terminal device 0 may receive the information on the link A. In the broadcast scenario, the terminal device 0 sends information on the link A, and any terminal device that can receive information from the terminal device 0 may receive the information on the link A.

In the unicast scenario, the transmit end may establish links to a plurality of receive ends. For example, for a terminal device 0 at a transmit end, the terminal device 0 may independently communicate with a plurality of terminal devices. For example, the terminal device 0 and a terminal device 1 establish a link A. The terminal device 0 sends information on the link A, and the terminal device 1 receives the information on the link A. The terminal device 0 and a terminal device 2 establish a link B. The terminal device 0 sends information on the link B, and the terminal device 2 receives the information on the link B.

The communication method in FIG. 4 may be used for the resource selection of the physical sidelink control channel PSCCH, or may be used for the resource selection of the physical sidelink shared channel PSSCH, or may be used for the resource selection of the physical sidelink feedback channel PSFCH, or may be used for the resource selection of the physical sidelink discovery channel PSDCH, or may be used for the resource selection of the physical sidelink broadcast channel PSBCH, or may be used for the resource selection of the another channel or signal. This is not limited in this embodiment of this application.

FIG. 5 is a schematic block diagram of a communications apparatus 500 according to an embodiment of this application. It should be understood that the communications apparatus 500 is merely an example. The communications apparatus in this embodiment of this application may further include other modules or units, may include modules having functions similar to those of the modules in FIG. 5, or may not necessarily include all the modules in FIG. 5.

In an embodiment of this application, a processing unit 510 is configured to determine a first parameter, where the first parameter is used to indicate a parameter of a sensing window, a parameter of a resource selection window, and/or a parameter of a first time window, and the first time window includes the sensing window and the resource selection window.

The processing unit 510 is configured to determine a first resource pool from at least one resource pool based on the first parameter.

The processing unit 510 is configured to select a first resource from the first resource pool.

A transmission unit 520 is configured to transmit sidelink information on the first resource.

It should be understood that the transmission unit 520 may be a sending unit, and is used by the communications apparatus 500 to send sidelink control information or sidelink data to another communications apparatus. Alternatively, the transmission unit 520 may be a receiving unit, and is used by the communications apparatus 500 to receive sidelink control information or sidelink data from another communications apparatus.

Optionally, one resource pool in the at least one resource pool has a corresponding time window parameter, and a time window parameter corresponding to the first resource pool is the first parameter.

Optionally, duration, indicated by the first parameter, of the resource selection window is greater than or equal to a processing delay of the first terminal device.

Optionally, the duration, indicated by the first parameter, of the resource selection window is less than or equal to duration of the sensing window.

Optionally, the duration, indicated by the first parameter, of the resource selection window is a smaller value in duration of a sensing window of the first resource pool and duration corresponding to a service delay requirement of the first terminal device.

Optionally, the parameter, indicated by the first parameter, of the sensing window is determined based on a resource location of a control channel and/or a time domain length of the control channel.

Optionally, the duration, indicated by the first parameter, of the resource selection window is determined based on a sensing result.

Optionally, that the processing unit 510 is configured to select a first resource from the first resource pool includes: The duration of the sensing window of the first resource pool is greater than or equal to duration of a resource selection window of the first resource pool, the processing unit is configured to select the first resource from the first resource pool based on a sensing result of a first time period in the sensing window, and duration of the first time period is equal to the duration of the resource selection window of the first resource pool.

Optionally, a start time of the first time period is a start time of the sensing window of the first resource pool.

Optionally, that the processing unit 510 is configured to select a first resource from the first resource pool includes: The duration of the sensing window of the first resource pool is less than or equal to duration of a resource selection window of the first resource pool, the processing unit is configured to select the first resource in a second time period in the resource selection window of the first resource pool based on a sensing result of the sensing window of the first resource pool, and duration of the second time period is equal to the duration of the sensing window of the first resource pool.

Optionally, a start time of the second time period is a start time of the resource selection window of the first resource pool.

Optionally, the first parameter includes at least one of the following parameters: a start time of the sensing window, an end time of the sensing window, a length of the sensing window, a start time of the resource selection window, an end time of the resource selection window, a length of the resource selection window, a start time of the first time window, an end time of the first time window, or a length of the first time window.

Optionally, the transmission unit 520 is further configured to: receive resource pool configuration information from a network device, where the resource pool configuration information is used to indicate the at least one resource pool and at least one time window parameter corresponding to the at least one resource pool.

In another embodiment of this application, a processing unit 510 is configured to determine a first parameter, where the first parameter is used to indicate a parameter of a sensing window, a parameter of a resource selection window, and/or a parameter of a first time window, and the first time window includes the sensing window and the resource selection window.

The processing unit 510 is configured to select a first resource from a first resource pool based on the first parameter.

A transmission unit 520 is configured to transmit sidelink information on the first resource.

It should be understood that the transmission unit 520 may be a sending unit, and is used by the communications apparatus 500 to send sidelink control information or sidelink data to another communications apparatus. Alternatively, the transmission unit 520 may be a receiving unit, and is used by the communications apparatus 500 to receive sidelink control information or sidelink data from another communications apparatus.

Optionally, duration of the sensing window, the resource selection window, and/or the first time window is in a unit of a slot or a symbol.

Optionally, the parameter, indicated by the first parameter, of the sensing window is determined based on a resource location of a control channel and/or a time domain length of the control channel.

Optionally, the duration, indicated by the first parameter, of the resource selection window is determined based on a sensing result.

Optionally, a sensing window of the first resource pool is located before a resource selection window of the first resource pool in time domain.

Optionally, that the processing unit 510 is configured to select a first resource from a first resource pool based on the first parameter includes: Duration of the sensing window of the first resource pool is greater than or equal to duration of the resource selection window of the first resource pool, the processing unit is configured to select the first resource from the first resource pool based on a sensing result of a first time period in the sensing window, and duration of the first time period is equal to the duration of the resource selection window of the first resource pool.

Optionally, a start time of the first time period is a start time of the sensing window of the first resource pool.

Optionally, that the processing unit 510 is configured to select a first resource from a first resource pool based on the first parameter includes: Duration of the sensing window of the first resource pool is less than or equal to duration of the resource selection window of the first resource pool, the processing unit is configured to select the first resource in a second time period in the resource selection window of the first resource pool based on a sensing result of the sensing window of the first resource pool, and duration of the second time period is equal to the duration of the sensing window of the first resource pool.

Optionally, a start time of the second time period is a start time of the resource selection window of the first resource pool.

Optionally, the first parameter includes at least one of the following parameters: a start time of the sensing window, an end time of the sensing window, a length of the sensing window, a start time of the resource selection window, an end time of the resource selection window, a length of the resource selection window, a start time of the first time window, an end time of the first time window, or a length of the first time window.

Optionally, the sensing window of the first resource pool is a periodic sensing window, or the resource selection window of the first resource pool is a periodic resource selection window, or a first time window of the first resource pool is a periodic first time window.

FIG. 6 is a schematic structural diagram of a network element according to an embodiment of this application. It should be understood that the communications apparatus 600 shown in FIG. 6 is merely an example. The communications apparatus in this embodiment of this application may further include other modules or units, or may include modules having functions similar to those of the modules in FIG. 6.

The communications apparatus 600 may include one or more processors 610, one or more memories 620, a receiver 630, and a transmitter 640. The receiver 630 and the transmitter 640 may be integrated together to obtain a transceiver. The memory 620 is configured to store program code executed by the processor 610. The processor 610 may be integrated with the memory 620, or the processor 610 is coupled to one or more memories 620, and is configured to invoke instructions in the memory 620.

In an embodiment, the processor 610 may be configured to implement operations or steps that can be implemented by a determining module 510 and a selection module 520 in FIG. 5. The receiver 630 and the transmitter 640 may be configured to implement operations or steps that can be implemented by a transmission module 530 in FIG. 5.

It should be understood that the processor in the embodiments of this application may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory in the embodiments of this application may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through example but not limitative description, random access memories (RAM) in various forms are available, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware, firmware, or any other combination thereof. When software is used to implement the embodiments, all or some of the foregoing embodiments may be implemented in a form of a computer program product. The computer program product includes one or more computer instructions or computer programs. When the computer instructions or computer programs are loaded or executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

A person of ordinary skill in the art may be aware that units, algorithms, and steps in the examples described with reference to the embodiments disclosed in this application can be implemented by electronic hardware or a combination of computer software and electronic hardware. Whether the functions are performed in a manner of hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the apparatus embodiments described above are merely examples. For example, division into the units is merely logical function division, and may be other division during actual implementation. For example, a plurality of units or components may be combined or integrated into another system, or some features may be ignored or not performed. In addition, the displayed or discussed mutual couplings, direct couplings, or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions in this application essentially, the part contributing to the conventional technology, or some of the technical solutions may be implemented in a form of a software product. The computer software product is stored in a storage medium and includes several instructions for instructing a computer device (which may be a personal computer, a server, a network device, or the like) to perform all or some of the steps of the methods in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   determining, by a first terminal device, a first parameter, wherein the first parameter indicates one or more of: a parameter of a sensing window, a parameter of a resource selection window, and a parameter of a first time window, and wherein the first time window comprises the sensing window and the resource selection window;
   determining, by the first terminal device, a first resource pool from at least one resource pool based on the first parameter;
   selecting, by the first terminal device, a first resource from the first resource pool; and
   transmitting, by the first terminal device, sidelink information on the first resource,
   wherein the first parameter comprises at least one of: a start time of the sensing window, an end time of the sensing window, a length of the sensing window, a start time of the resource selection window, an end time of the resource selection window, a length of the resource selection window, a start time of the first time window, an end time of the first time window, or a length of the first time window.

2. The method according to claim 1, wherein one resource pool in the at least one resource pool has a corresponding time window parameter, and a time window parameter corresponding to the first resource pool is the first parameter.

3. The method according to claim 1, wherein the first parameter indicates a duration of the resource selection window, and the duration of the resource selection window is greater than or equal to a processing delay of the first terminal device.

4. The method according to claim 1, wherein the first parameter indicates a duration of the resource selection window, and the duration of the resources selection window is less than or equal to a duration of the sensing window.

5. The method according to claim 1, wherein the first parameter indicates a duration of the resource selection window, and the duration of the resource selection window is a smaller value than a duration of a sensing window of the first resource pool and a duration corresponding to a service delay requirement of the first terminal device.

6. The method according to claim 1, wherein the parameter of the sensing window is determined based on one or more of a resource location of a control channel and a time domain length of the control channel.

7. The method according to claim 1, wherein the first parameter indicates a duration of the resource selection window, and the duration of the resource selection window is determined based on a sensing result.

8. The method according to claim 1, wherein the selecting, by the first terminal device, the first resource from the first resource pool comprises:
   selecting, by the first terminal device, the first resource from the first resource pool based on a sensing result of a first time period in the sensing window, wherein a duration of the sensing window of the first resource pool is greater than or equal to a duration of a resource selection window of the first resource pool, and wherein a duration of the first time period is equal to the duration of the resource selection window of the first resource pool.

9. The method according to claim 1, wherein the selecting, by the first terminal device, the first resource from the first resource pool comprises:
   selecting, by the first terminal device, the first resource in a second time period in the resource selection window of the first resource pool based on a sensing result of the sensing window of the first resource pool, wherein a duration of the sensing window of the first resource pool is less than or equal to a duration of a resource selection window of the first resource pool, and wherein a duration of the second time period is equal to the duration of the sensing window of the first resource pool.

10. The method according to claim 1, wherein the method further comprises:

receiving, by the first terminal device, resource pool configuration information from a network device, wherein the resource pool configuration information is used to indicate the at least one resource pool and at least one time window parameter corresponding to the at least one resource pool.

11. A communication method, comprising:
determining, by a first terminal device, a first parameter, wherein the first parameter indicates one or more of: a parameter of a sensing window, a parameter of a resource selection window, and a parameter of a first time window, and wherein the first time window comprises the sensing window and the resource selection window;
selecting, by the first terminal device, a first resource from a first resource pool based on the first parameter; and
transmitting, by the first terminal device, sidelink information on the first resource,
wherein the first parameter comprises at least one of: a start time of the sensing window, an end time of the sensing window, a length of the sensing window, a start time of the resource selection window, an end time of the resource selection window, a length of the resource selection window, a start time of the first time window, an end time of the first time window, or a length of the first time window.

12. The method according to claim 11, wherein the sensing window of the first resource pool is a periodic sensing window, or the resource selection window of the first resource pool is a periodic resource selection window, or a first time window of the first resource pool is a periodic first time window.

13. The method according to claim 11, wherein the parameter of the sensing window is determined based on one or more of a resource location of a control channel and a time domain length of the control channel.

14. The method according to claim 11, wherein the first parameter indicates a duration of the resource selection window, and the duration of the resource selection window is determined based on a sensing result.

15. The method according to claim 11, wherein a sensing window of the first resource pool is located before a resource selection window of the first resource pool in a time domain.

16. The method according to claim 11, wherein the selecting, by the first terminal device, the first resource from the first resource pool based on the first parameter comprises:
selecting, by the first terminal device, the first resource from the first resource pool based on a sensing result of a first time period in the sensing window, wherein a duration of the sensing window of the first resource pool is greater than or equal to a duration of the resource selection window of the first resource pool, and wherein a duration of the first time period is equal to the duration of the resource selection window of the first resource pool.

17. The method according to claim 11, wherein the selecting, by the first terminal device, the first resource from the first resource pool based on the first parameter comprises:
selecting, by the first terminal device, the first resource in a second time period in the resource selection window of the first resource pool based on a sensing result of the sensing window of the first resource pool, wherein a duration of the sensing window of the first resource pool is less than or equal to a duration of the resource selection window of the first resource pool, and wherein a duration of the second time period is equal to the duration of the sensing window of the first resource pool.

18. A communications apparatus, comprising:
a processor configured to:
determine a first parameter, wherein the first parameter indicates one or more of:
a parameter of a sensing window, a parameter of a resource selection window, and a parameter of a first time window, and wherein the first time window comprises the sensing window and the resource selection window;
determine a first resource pool from at least one resource pool based on the first parameter; and
select a first resource from the first resource pool; and
a transmitter configured to transmit sidelink information on the first resource,
wherein the first parameter comprises at least one of: a start time of the sensing window, an end time of the sensing window, a length of the sensing window, a start time of the resource selection window, an end time of the resource selection window, a length of the resource selection window, a start time of the first time window, an end time of the first time window, or a length of the first time window.

19. The communications apparatus according to claim 18, wherein the parameter of the sensing window is determined based on one or more of a resource location of a control channel and a time domain length of the control channel.

20. The communications apparatus according to claim 18, wherein the first parameter indicates a duration of the resource selection window, and the duration of the resource selection window is determined based on a sensing result.

* * * * *